United States Patent [19]

Suzuki et al.

[11] Patent Number: 5,043,399

[45] Date of Patent: Aug. 27, 1991

[54] POLYACETAL COMPOSITION

[75] Inventors: Yoshio Suzuki; Tamikuni Komatsu; Mikihiko Nakamura; Shigeo Shiihashi, all of Fuji, Japan

[73] Assignee: Asahi Kasei Kogyo Kabushiki Kaisha, Osaka, Japan

[21] Appl. No.: 247,483

[22] Filed: Sep. 21, 1988

[30] Foreign Application Priority Data

| Sep. 22, 1987 | [JP] | Japan | 62-238039 |
| Sep. 22, 1987 | [JP] | Japan | 62-238040 |
| Dec. 4, 1987 | [JP] | Japan | 62-306885 |
| Dec. 25, 1987 | [JP] | Japan | 62-328711 |
| Mar. 3, 1988 | [JP] | Japan | 63-50034 |
| Mar. 4, 1988 | [JP] | Japan | 63-49862 |

[51] Int. Cl.$^5$ .............. C08L 59/00; C08L 61/02; C08L 67/02; C08L 77/10
[52] U.S. Cl. ..................... 525/400; 525/427
[58] Field of Search .................. 525/427, 400

[56] References Cited

U.S. PATENT DOCUMENTS

| 3,549,734 | 12/1970 | Yasuda et al. | 525/427 |
| 3,883,452 | 5/1975 | Scheuerlein et al. | 525/427 |
| 4,230,838 | 10/1980 | Foy et al. | |
| 4,331,786 | 5/1982 | Foy et al. | |
| 4,668,761 | 5/1987 | Aoshima et al. | |
| 4,820,796 | 4/1989 | Suzuki et al. | |

FOREIGN PATENT DOCUMENTS

| 0115847 | 8/1984 | European Pat. Off. |
| 0116456 | 8/1984 | European Pat. Off. |
| 3410242 | 9/1984 | Fed. Rep. of Germany |
| 59-191752 | 10/1984 | Japan |
| 1183345 | 8/1986 | Japan ................. 525/400 |

OTHER PUBLICATIONS

Patent Abstracts of Japan, vol. 10, No. 17 (C-324)[2074], 1/23/86, JP-A-60 170652 (Asahi Kasei Kogyo K.K.).

Patent Abstracts of Japan, vol. 11, No. 3 (C-395)[2450], 1/7/87; JP-A-61 183345 (Toray Ind. Inc.).

Primary Examiner—John C. Bleutge
Assistant Examiner—Vasu S. Jagannathan
Attorney, Agent, or Firm—Birch, Stewart, Kolasch & Birch

[57] ABSTRACT

There are disclosed a polyacetal composition comprising
(A) 70-97% by weight of a polyacetal and
(B) 30-3% by weight of a transparent polyamide elastomer represented by the general formula

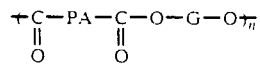

in which PA and G represent the groups specified as in the body of the text;
said polyamide elastomer exhibiting a relative viscosity of at least 1.5 in m-cresol at 30° C. and at a polymer concentration of 0.5 g/dl and
a 1-mm thick sheet of the polyamide elastomer having a haze of not more than 75%, and streched and oriented polyacetal material using it.

17 Claims, 1 Drawing Sheet

FIG. 1

POLYACETAL COMPOSITION

BACKGROUND OF THE INVENTION

1. Field of the Invention

The present invention relates to polyacetal compositions which contain a polyamide elastomer and are improved thereby in impact resistance and to novel stretched and oriented polyacetal-based materials having high modulus. More particularly, the invention relates to polyacetal compositions which can provide molding products having superior impact resistance, heat resistance, and stiffness and also good lubricity and surface gloss and hence are fitted as materials for use, for example, in the areas of electronics, automobiles, office automation appliances, and household appliances. Further, the invention relates to stretched and oriented polyacetal-based materials having properties different clearly from those of conventional polyacetal-based molding materials in that the former stretched materials are high in strengths such as tensile strength and tensile modulus in the direction of molecular orientation as well as high in strengths such as knot strength, hook strength, and impact resistance in the direction (lateral direction) perpendicular to the orientation direction and are also superior in surface activities such as adhesive properties; hence these stretched, oriented, polyacetal-based materials are suited especially to form, jointly with other materials, composites for use in areas wherein high strength and high modulus are necessary.

2. Description of the Related Art

Polyacetals regarded as engineering resins having a good balance of mechanical properties with electrical properties, have so far been used in various areas, but have the disadvantage of insufficient impact resistance.

Accordingly, extensive studies have been made up to now for the purpose of offsetting the deficient impact strength of polyacetals and various blends of polyacetals with polyurethane elastomers have been proposed. These proposed blends include, for example, a gloss-less polyacetal composition (Japanese Patent Application Kokai (Laid-Open) No. 59-145243) superior in impact strength made by blending 5-60% by weight of an aliphatic polyurethane elastomer having special properties and a polyacetal composition (Japanese Patent Application Kokai No. 59-155453) improved in impact resistance by dispersing 15-40% by weight of a polyurethane elastomer to fine particle sizes of 0.01 to 0.9 μm in a polyacetal. However, these polyacetal compositions, though improved in impact resistance to a large extent, have lower flexural modulus, thus being impaired in stiffness, which is one of the favorable properties of polyacetal. Further, an attempt (Japanese Patent Application Kokai No. 61-19652) has been made to improve the impact resistance over a wide range of temperatures and inhibit the deterioration of flexural modulus by blending with 5-50% by weight of a polyurethane elastomer which is a copolymer of 4,4'-methylene-bis(-phenylisocyanate), polyoxytetramethylene glycol, and low-molecular, straight-chain diol. In this case, however, the deterioration of flexural modulus or stiffness is also inevitable.

On the other hand, there are known polyacetal compositions resulting from blending materials besides polyurethane elastomers. An example of these compositions is a blend with an aliphatic polyether (Japanese Patent Publication No. 50-33095), another example of the compositions is a blend with a copolyester (Japanese Patent Publication No. 60-19331), and other examples of the compositions are blends with polyamide elastomers (Japanese Patent Application Kokai Nos. 59-191752 and 61-183345). However, none of these compositions are improved much satisfactorily in both impact resistance and flexural modulus. The above Patent Application Kokai No. 59-191752 suggests mixing of a commercial nylon-12 elastomer with a polyacetal to impart antistatic properties thereto. However, the present inventor's experiment tracing this composition reveals that it is scarcely improved in impact resistance. In addition, this blending enhances but insufficiently the antistatic properties.

As stated above, no polyacetal composition has yet been found out that is superior in both impact resistance and stiffness. Hence the development of such a polyacetal composition has been strongly desired.

Recently, polyacetals have also been studied for the purpose of applying them especially as raw materials of composites for use in areas wherein materials of high strength and high modulus are necessary.

The method of heating and stretching a polyacetal in the air (Japanese Patent Application Kokai No. 50-77479) has so far been known as an example of means for producing polyacetal articles of high modulus. According to this method, a tensile modulus as high as 49 GPa can be achieved, but voids form in the polyacetal and its fibrillation takes place during the stretch. Hence this method has a drawback in that as the modulus is increased, the apparent density and the strength decrease inevitably. For example, the present inventors experiment tracing this method has confirmed that as the tensile modulus of polyacetal is increased up to 42GPa by stretching it, the apparent density thereof decreases from 1.42 g/cm$^3$ before stretch to 1.15g/cm$^3$ after stretch and the tensile strength decreases to 1.1 GPa and that the stretch results in not only such decrease in stretch-directional mechanical strength but also decrease in transverse mechanical strength, that is to say, the stretch tends to give rise to buckling, napping, splitting, and tearing.

For the purpose of producing the stretched and oriented polyacetal materials superior in mechanical strength not only in the stretch direction but also in the transverse direction, the present inventors, previously stretched a polyacetal under heated and pressurized conditions by using a special means, whereby the transverse mechanical strength of the stretched polyacetal was found to improve outstandingly (Japanese Patent Application Kokai Nos. 60-183121 and 60-183122). However, common polyacetals before stretch are chemically inactive by nature and after stretch are more inactive and therefore the material stretched as stated above had the drawback of being difficult to form composites.

Meanwhile, the addition of other compounds to polyacetals has been tried for the purpose of modifying the polyacetals. As an example, a polyacetal composition containing a polyurethane elastomer is expectable to be improved in not only impact resistance but also surface activity since the polyurethane elastomer is polar. Accordingly, the present inventors tried to stretch such the polyacetal composition, but tensile modulus and tensile strength of the stretched polyacetal were found to be about 10 GPa and about 0.7 GPa, respectively, thus being unsatisfactory for practical use, though an increase in the surface activity was observed.

Another known polyacetal-other compound composition is a blend of polyacetal with a polyamide elastomer consisting of nylon-12 segments and polytetramethylene oxide segments (Japanese Patent Application Kokai Nos. 59-191752, cited above, and 61-183345), but the stretch of this composition is not tried. As can be seen also from the above stated stretch experiment, however, it is readily estimated that although elastomer-containing polyacetals, either unstretched or stretched, will be provided with so-called rubber elasticity (viscosity), in other words, impact resistance and flexibility that are properties of elastomers, so-called crystallinity (rigidity), in other words, the stiffness and strength of such polyacetal compositions, on the contrary, will be impaired.

While a great number of polyacetal compositions improved in rubber elasticity or hydrophilicity by blending various additives are known other than the above stated compositions, said additives are, so to say, impurities and hence may cause breaks of the compositions under stretch, so that no high modulus or high strength can be expected.

As stated above, it has been tried recently to use stretched polyacetals in areas wherein materials of high modulus or high strength are necessary. Depending upon their applications, the use of stretched polyacetals in composites are possible. Accordingly, stretched polyacetal materials having high modulus, high strength and surface activity are looked for, but none of such materials have yet been discovered.

SUMMARY OF THE INVENTION

It is an object of the present invention to provide a polyacetal composition, in response to such requirements as stated above, which is given impact resistance without much impairing any of properties such as excellent moldability, mechanical strength, stiffness, heat resistance and solvent resistance, particularly stiffness, which are inherent in polyacetals, or the balance of these properties.

It is another object of the present invention to provide stretched and oriented, polyacetal-based material which are high is strengths such as tensile strength and tensile modulus in the molecular orientation direction as well as in strengths such as knot strength, hook strength, and impact strength in the direction (lateral direction) perpendicular to the orientation direction and are also superior in surface activities such as adhesive properties.

As a result of intensive studies made with the above objects, the present inventors have found that these objects can be achieved by blending an elastomer having a particular structure with a polyacetal in definite proportions. Based on this finding, the present invention has been accomplished.

That is, according to the present invention, there are provided (1) a polyacetal composition which comprises
(A) 70–97% by weight of a polyacetal and
(B) 30–3% by weight of a transparent polyamide elastomer represented by the general formula wherein, PA denotes a radical remaining after removal of the carboxy groups from either (i) a polyamidedicarboxylic acid having a number average molecular weight of 400 to 3000 formed from both caprolactam and a $C_4$–$C_{20}$ dicarboxylic acid or (ii) a polyamide-imide-dicarboxylic acid having a number average molecular weight of 400 to 3000 formed from both caprolactam and a trivalent or tetravalent aromatic polycarboxylic acid which can form at least one imide ring and G denotes a radical remaining after removal of the hydroxy groups from at least one glycol selected from a polyalkylene glycol, an $\alpha,\omega$-dihydroxyhydrocarbon, and a polyester glycol having a hydroxy group at each end of the molecule produced by reacting one of the above two glycols with a $C_4$–$C_{40}$ dicarboxylic acid, each glycol having a number average molecular weight of 500 to 8000, the polyamide elastomer exhibiting a relative viscosity of at least 1.5 in m-cresol at 30° C. and at a polymer concentration of 0.5 g/dl, and a 1-mm thick sheet of the polyamide elastomer having a haze value of not more than 75%, and (2) a stretched and oriented polyacetal-based material having a tensile modulus of at least 10 GPa formed from said polyacetal composition.

The present invention is based on the finding that polyacetals can be improved in impact resistance, while retaining their stiffness, by blending them with particular amounts of a polyamide elastomer having a specific structure in which hard segments consist of polycapramide residues or polycapramide-imide residues and soft segments consist of polyoxyalkylene glycol residues, $\alpha,\omega$-dihydroxyhydrocarbon residues, or residues of polyester glycol produced by reacting one of the above two glycols with a dicarboxylic acid, and that a stretched material having a tensile modulus of at least 10 GPa can be obtained by stretching said polyacetal composition. It has also been found that a polyacetal blend with the polyamide elastomer having polyethylene glycol soft segments exhibits superior antistatic properties.

DETAILED DESCRIPTION OF PREFERRED EMBODIMENTS

An acetal homopolymer or copolymer is used as component (A) of the composition and stretched materials of the present invention. The number average molecular weight of the acetal homopolymer to use ranges generally from 15,000 to 200,000 (MI 0.1–50l), preferably from 25,000 to 100,000 (MI 0.5–30). The acetal copolymer to use is a polyoxymethylene copolymer having at least one ether or polyether segment in the molecular chain. The number average molecular weight of the acetal copolymer normally used ranges desirably from 10,000 to 200,000 (MI 0.1–50), preferably from 20,000 to 100,000 (MI 0.5–30). While there is no particular restriction on the acetal copolymer so far as it satisfies the above condition, it is preferable to use a copolymer having 90–99.6 mole %, particularly 95–99.6 mole %, of oxymethylene units and 10–0.4 mole %, particularly 5–0.4 mole %, of ether segments which have each at least two carbon atoms and are scattered in the molecular chain of the copolymer. When the content of oxymethylene units is less than 90 mole %, the modulus and strength of the copolymer are too low to provide the composition combining stiffness and impact resistance and the stretched and oriented material having a high modulus according to the present invention. When the content of oxymethylene units is close to 100 mole %, the modulus of the copolymer is substantially equal to that of the homopolymer.

The polyamide elastomer used as component (B) in the present invention is a transparent, tough, homogeneous block polymer which has residues of polycapramide or of polycapramide-imide as hard segments and residues of polyoxyalkylene glycol, of $\alpha,\omega$-dihydroxyhydrocarbon, or of polyester glycol having a hydroxy group at each end of the molecule, as soft segments, gives a relative viscosity of at least 1.5 in m-cresol (0.5 g/dl) at 30° C., and in the form of a 1-mm thick sheet, exhibits a haze value of not more than 75%.

When the relative viscosity of said elastomer is less than 1.5, the elastomer will be brittle and when incorporated into polyacetals, will not enough exhibit the effect of improving the impact resistance but is rather liable to give rise to a decrease in the strength. Number average molecular weight of the hard segments of the elastomer are desirably in the range of about 400 to about 3000, since when these molecular weights are too low, such elastomers are inferior in strength and when these molecular weights are excessively high, such elastomers are difficult to knead with polyacetals. The content of hard segments in the elastomer is desirably in the range of 10 to 65% by weight. When this content is higher than 65% by weight, the compatibility of such an elastomer with polyacetals will be low and when the content is less than 10% by weight, the rubber elasticity of such an elastomer will be low. In both cases, the effect of improving the impact resistance is insufficient.

The shaped, stretched material, when the content of hard segments in the polyamide elastomer is less than 10% by weight, will be insufficient is surface activity and when said content exceeds 65% by weight, the compatibility of a such elastomer with polyacetals will be low as stated above and hence it will be difficult to attain stretched materials of high strength and high modulus. For the purpose of improving the impact resistance, the content of hard segments is preferably from 15 to 45% by weight. For the purpose of providing stretched materials of high strength and high modulus, the content of hard segments is preferably from 20 to 50% by weight.

Such contents and number average molecular weights of polyamide segments are chosen properly depending upon the intended properties of the elastomer to prepare and the molecular weight of the glycol to use.

Hard segments of the polyamide elastomer are formed from caprolactam and either a $C_4$–$C_{20}$ dicarboxylic acid or a trivalent or tetravalent aromatic polycarboxylic acid. Such $C_4$–$C_{20}$ dicarboxylic acids include; aliphatic dicarboxylic acids, e.g. adipic acid, sebacic acid, azelaic acid, and dodecanedicarboxylic acid, alicyclic dicarboxylic acids, e.g. cyclohexanedicarboxylic acid and decalindicarboxylic acid; and aromatic dicarboxylic acids, e.g. isophthalic acid, terephalic acid, and naphthalenedicarboxylic acid.

The above trivalent aromatic carboxylic acid is an aromatic tricarboxylic acid two carboxy groups of which are attached to an aromatic ring at positions neighboring to each other. The above tetravalent aromatic carboxylic acid is an aromatic tetracarboxylic acids having two pairs of such adjacent carboxy groups. Examples of these aromatic carboxylic acids include 1,2,4-trimellitic acid, 1,2,5-naphthalenetricarboxylic acid, 2,6,7-naphthalenetricarboxylic acid, 3,3',4-diphenyltricarboxylic acid, benzophenone-3,3',4-tricarboxylic acid, diphenyl sulfone-3,3',4-tricarboxylic acid, diphenyl ether-3,3',4-tricarboxylic acid, pyromellitic acid, diphenyl-2,2',3,3'-tetracarboxylic acid, benzophenone-2,2',3,3'-tetracarboxylic acid, diphenyl sulfone-2,2',3,3'-tetracarboxylic acid, and diphenyl ether-2,2',3,3'-tetracarboxylic acid.

The glycol component (soft segments) of the polyamide elastomer used in the present invention is one member or a mixture of two or more members selected from the group consisting of polyoxytetramethylene glycols, oxyalkylene-modified polyoxytetramethylene glycols, polyoxyethylene glycols, $\alpha,\omega$-dihydroxyhydrocarbons, and polyester glycols having a hydroxy group at each end of the molecule formed from the above glycols and $C_4$–$C_{40}$ dicarboxylic acids.

The number average molecular weight of said polyoxytetramethylene glycols, oxyalkylene-modified polyoxytetramethylene glycols, polyoxyethylene glycols, and $\alpha,\omega$-dihydroxyhydrocarbons is desirably from 500 to 4000. When this molecular weight is less than 500, problems arise such that the melting point of the resulting elastomer is undesirably low and other properties of the elastomer are unsatisfactory, though these problems depend upon the amount of glycol copolymerized. On the other hand, when the above molecular weight exceeds 4000, the resulting elastomer is liable to lose rubber elasticity at low temperatures or to have insufficient effect of improving the impact resistance.

Suitable $\alpha,\omega$-dihydroxyhydrocarbons for soft segments of the elastomer are, for example, polyolefin glycols and hydrogenated polybutadiene glycol that can be prepared by polymerizing an olefin and butadiene, respectively, hydroxylating the molecular ends of the resulting polymers, and hydrogenating the double bonds of the polymers. The number average molecular weight of these dihydroxy hydrocarbons is desirably in the range of 500 to 4000. When the number average molecular weight is less than 500, the resulting elastomer will have a low melting point and other inferior properties. When the molecular weight exceeds 4000, the number of reactive sites is too small to carry out the copolymerization smoothly and the resulting elastomer, if used, will not enough exhibit the effect of improving polyacetals.

When the high molecular glycol soft segments are formed from a polyoxytetramethylene glycol having a number average molecular weight of more than 4000, the resulting elastomer tends to be inferior in low-temperature properties and have a low rubber elasticity, hence being inadequate to produce the effect of improving polyacetals in impact resistance.

In particular, when all the soft segments are formed from polyoxytetramethylene glycol, its number average molecular weight is desired to be from 500 to 3000 in view of low-temperature properties of the resulting elastomer. Depending upon the composition of the intended elastomer, preferred number average molecular weights of the polyoxytetramethylene glycol are from 800 to 3000 in the aspect of the strength and low-temperature properties of the resulting elastomer. Moreover, from the viewpoint of low-temperature properties of the elastomer, particularly preferred polyoxytetramethylene glycols, when their number average molecular weights are from 1500 to 3000, are those having sharp molecular weight distributions of up to 1.6 in terms of $\overline{Mvis}/\overline{Mn}$ wherein, $\overline{Mn}$ is the number average molecular weight and $\overline{Mvis}$ is the viscosity average molecular weight defined by the equation $$\overline{Mvis} = anti\ log(0.493\ log\ \eta + 3.0646)$$

($\eta$ is the meltviscosity expressed in poise at 40° C.)

In the present invention, oxyalkylene-modified polyoxytetramethylene glycol can be used instead of the above polyoxytetramethylene glycol. This modified polyoxytetramethylene glycol is, for example, the product of partial replacement of the —(CH$_2$)$_4$—O— units of the ordinary polyoxytetramethylene glycol by —R—O— units. R herein denotes an alkylene group of 2 to 10 carbon atoms. Preferred examples of R include ethylene, 1,2-propylene, 1,3-propylene, 2-methyl-1,3-propylene, 2,2-dimethyl-1,3-propylene, pentamethylene, and hexamethylene groups. There is no particular restriction on the degree of modification, but this is generally chosen from the range of 3 to 50% by weight. This degree of modification and the kind of alkylene group R are chosen properly consideration of low-temperature properties of the resulting elastomer and its compatibility with the polyacetal to use.

The oxyalkylene-modified polyoxytetramethylene glycol can be produced, for instance, by the copolymerization of tetrahydrofuran with a diol in the presence of a heteropolyacid catalyst or by the copolymerization of butanediol with either a diol or a cyclic ether that is a condensate of diol.

The polyoxyethylene glycol to be used has a number average molecular weight of 400 to 4000. When this number average molecular weight is less than 400, the resulting elastomer will hardly exhibit rubber elasticity. When this molecular weight exceeds 4000, the number of reactive sites is too small to provide a polyamide elastomer having sufficient improving effect on polyacetals. In particular, when polyoxyethylene glycol alone is used for soft segments, its number average molecular weight is preferred to lie in the range of 400 to 2500 since polyoxyethylene glycol similarly to polyoxytetramethylene glycol becomes more liable to freeze as the molecular weight is increased.

Polyacetals themselves have tendencies to become electrically charged and when used as electronic parts, may undergo undesirable electrification. Japanese Patent Application Kokai No. 59-191752, as stated already, discloses that a polyamide elastomer on blending with a polyacetal exhibits antistatic effect. Examples of this patent application disclose a polyamide elastomer constituted of nylon-12 hard segments and polyoxytetramethylene glycol soft segments, but the improving effect of this elastomer is insufficient. The polyamide elastomer constituted of polycapramide or polycapramide-imide hard segments and polyoxyethylene glycol soft segments according to the present invention has very great antistatic effect and hence can be used as an ingredient to provide polyacetal compositions having improved impact resistance as well as superior antistatic properties.

The polyester glycol to be used for soft segments of the elastomer needs to have a number average molecular weight of 500 to 8000. This polyester glycol is constituted of (i) at least one glycol having a number average molecular weight of 200 to 4000 selected from polyoxytetramethylene glycol, oxyalkylene-modified polyoxytetramethylene glycol, polyoxyethylene glycols and $\alpha,\omega$-dihydroxyhydrocarbons and (ii) a C$_4$-C$_{40}$ dicarboxylic acid. When the number average molecular weight of polyester glycol is less than 500, the resulting elastomer will have a low melting point and other inferior properties. When this molecular weight exceed 8000, the resulting elastomer will be inferior in low-temperature properties and hardly exhibit rubber elasticity, hence being inadequate to produce the effect of improving polyacetals in impact resistance.

Suitable C$_4$-C$_{40}$ dicarboxylic acids for use to prepare the polyester glycol are aliphatic dicarboxylic acids of 4 to 40 carbon atoms, alicyclic dicarboxylic acids of 8 to 20 carbon atoms, and aromatic dicarboxylic acids of 8 to 20 carbon atoms. The aliphatic dicarboxylic acids include, e.g. adipic acid, sebacic acid, azelaic acid, dodecanedicarboxylic acid, and dimer acid; the alicyclic dicarboxylic acids include, e.g. cyclohexanedicarboxylic acid, decalindicarboxylic acid; and the aromatic dicarboxylic acids include, e.g. isophthalic acid, terephthalic acid, and naphthalenedicarboxylic acid.

The polyamide elastomer or the polyamide-imide elastomer to be used in the present invention needs to be transparent or free of cloudiness to such an extent that a 1-mm thick sheet of the elastomer may not have a haze value of more than 75%. This transparency is an index of the uniform polymerization carried out to produce the polyamide or polyamide-imide elastomer. The haze value when exceeding 75% means that cloudiness has developed and this indicates that the content of polyamide or polyamide-imide is not the same throughout the elastomer but different locally. Such an elastomer is undesirable since it has low compatibility with polyacetals and its blending with polyacetals improves them scarcely. When the above glycol, e.g. the polyoxytetramethylene glycol, is used singly, the compositional uniformity of the elastomer can be seen more accurately in terms of the polyamide partition ratio defined below. The use of the polyamide elastomer having a polyamide partition ratio of 0.7 to 1.3 results in a polyacetal composition improved in impact resistance and an stretched and oriented material superior in strength and modulus.

The term "polyamide partition ratio" used herein means the following value. That is, a sample of the elastomer is admixed with at least one solvent selected from methanol, ethanol, hexafluoroisopropanol, chloroform, and formic acid so that about 40-60% of the sample may be dissolved, and the dissolved portion and the undissolved portion are separated from each other. Both the portions are analyzed by H$^1$-NMR in a solvent mixture of phenol and deuterochloroform, and the polyamide content (wt %) in each of the dissolved portion and the undissolved portion is determined from the ratio of the absorbance at 3.3-3.4 ppm due to the methylene groups adjoining to oxygen atoms in the polyoxytetramethylene glycol to the absorbance at 2.0-2.1 the methylene groups adjoining to carbonyl groups in the polycapramide. Thus the polyamide partition ratio is expressed by the equation:

$$\text{Polyamide partition ratio} = \frac{\text{Polyamide content of dissolved portion}}{\text{Polyamide content of undissolved portion}}$$

This partition ratio can also be determined from infrared absorption spectra. That is, said separated portions of the elastomer are dissolved each in hexafluoroisopropanol to a concentration of 3 to 10% by weight, and each solution is cast on a KBr plate to form a film. In an infrared absorption spectrum of each film, the intensity ratio of the second absorption of amide groups at 1540–1550cm$^{-1}$ to the absorption of the ether bonds at 1110–1115cm$^{-1}$ was determined. Therefrom, the polyamide content in each portion is determined with the aid of a calibration curve prepared previously. The polyamide partition ratio determined from infrared absorption spectra is in near agreement with the value determined from NMR spectra. Therefore, the infrared absorption method is convenient when the calibration curve can be prepared.

When this partition ratio is less than 0.7 or exceeds 1.3, the elastomer has a low tensile strength or nonuniform composition, which is indicated by low transparency. Such elastomers, if used, will not enough exhibit the effect of improving the polyacetal in impact resistance.

As stated above, the polyamide partition ratio is an index of the uniformity of composition. While both the polycapramide segment and the polyoxytetramethylene glycol segment have some molecular weight distributions, the polyamide partition ratio should be 1 at any proportion of the dissolved portion if the elastomer has been produced by completely uniform polymerization. However, some fluctuations of the composition may conceivably occur in the actual polymerization even if it is carried out uniformly. The polyamide elastomer having a polyamide partition ratio in range of from 0.7 to 1.3 exhibits such physical properties as flexibility, toughness and transparency.

The solvent system for measuring the polyamide partition ratio is chosen properly depending upon the content and average molecular weight of polycapramide hard segments, since the solubility varies with the polycapramide content and increases with a decrease in the molecular weight and vice versa. In general, it is desirable that an ethanol-chloroform solvent mixture be used when the number average molecular weight of polycapramide is from 400 to 700, a methanol-chloroform solvent mixture be used when said molecular weight is from 700 to 1400, and a methanol-hexafluoro-isopropanol solvent mixture be used when said molecular weight is from 1400 to 3000 or a formic acid-methanol solvent mixture be used when said molecular weight is from 900 to 3000. When the number average molecular weight of polycapramide lies in the vicinity of a boundary where a solvent system is changed to another solvent system, either of the solvent systems may be used. The proportion of each component in mixed solvent can be optionally chosen.

For the preparation of the polyamide elastomer there have so far been proposed various methods including for example, a method comprising the dehydration-condensation of a polyamide having a carboxyl group at each end of the molecule and a polyoxyalkylene glycol in the presence of a catalyst (Japanese Patent Publication Nos. 56-45419 and 58-11459) and a method comprising the polymerization of a mixture of either an aminocarboxylic acid or a lactam of at least 10 carbon atoms with a polyoxyalkylene glycol and with a dicarboxylic acid in the presence of water (Japanese Patent Publication No. 57-24808). In the latter method, the polymerization of lactam takes place preferentially while the esterification scarcely takes place and hence the polymerization system consists mainly of a mixture of carboxy-terminated polyamide and polyoxyalkylene glycol [See Die Angewante Makromolekulare Chemie, Vol. 74, p 49 (1978)], and then both the reactants are dehydrated and condensed. Another example of the proposed methods comprises heating and melting a mixture of ε-aminocaproic acid, polyoxytetramethylene glycol, and a dicarboxylic acid and polymerizing the mixture (Japanese Patent Application Kokai No. 58-21095). In this method, the polymerization of ε-aminocaproic acid proceeds quickly and produces a large amount of water, a polyamide is produced preferentially during the melting and in the initial stage of polymerization, and thereafter the condensation of a carboxy-terminated polycapramide with the polyoxytetramethylene glycol takes place to produce a polyetheresteramide.

According to any of these methods, a carboxy-terminated polycapramide produced previously or in the place of polymerization is condensed with a polyoxyalkylene glycol; however, the very poor miscibility of both the reactants with each other results in the reparation of coarse particles during polymerization, producing a milky-white melted state, and this state is retained until the end point of polymerization, hence forming no polymer of high uniformity. In particular, when the polyoxyalkylene glycol or the α,ω-dihydroxyhydrocarbon has a high number average molecular weight, this tendency is remarkable. For instance, when a polyoxyalkylene glycol having a number average molecular weight of 800 to 3000 is used in these methods, the melted state presents a milky-white color and the resulting elastomer exhibits a polyamide partition ratio of not more than 0.5 and hence is opaque and inferior in strength. The use of such a polyamide elastomer scarcely improve polyacetals in impact resistance and the resulting polyacetal composition provides no stretched and oriented material having a sufficiently high modulus. Accordingly, none of the above methods can be used to produce the present inventive polyamide elastomer.

Suitable methods for the production of the present inventive polyamide elastomer should not give rise to the coarse phase separation and can retain a transparent melted state, during polymerization. An example of such methods comprises the polymerization of caprolactam, a dicarboxylic acid, and a polyoxytetramethylene glycol at a temperature of 150° to 300° C., preferably 180° to 280° C., while maintaining the water content in the polymerization system within the range of 0.1 to 1% by weight. Unlike the above methods, this method causes the amide formation and the esterification at the same time and allows the polymerization to proceed while maintaining the polymerization system in a transparent melted state. After the polymerization has been finished, the unreacted caprolactam is removed and if necessary, after-polymerization is conducted in addition at a temperature of 200° to 300° C., preferably 230° to 280° C., whereby a transparent elastomer having a polyamide partition ratio of from 0.7 to 1.3 can be obtained. The above control of the water content in the polymerization system can be carried out under a stream of inert gas or under reduced pressure.

Another advantageous method comprises polymerizing three reactants: a polycapramide having a carboxy group at each end of the molecule, caprolactam in an amount of at least 0.7 time the amount of said polycapramide and a polyoxytetramethylene glycol at a temperature of 150° to 300° C., preferably 180° to 280° C. while eliminating formed water. Also in this method, the amide formation and the esterification proceed simultaneously and as the polymerization proceeds, coarse phase separation disappears and the polymerization system becomes in a transparent, uniform melted state. After completion of the polymerization, a transparent elastomer having a polyamide partition ratio of from 0.7 to 1.3 can be obtained, similarly to the former method, by removing the unreacted caprolactam and if necessary, conducting in addition after-polymerization at 200°–300° C., preferably at 230°–380° C.

When the polyoxytetramethylene glycol is replaced in these methods by a polyoxyethylene glycol, $\alpha,\omega$-dihydroxyhydrocarbon, mixture of these two glycols, or mixture of one or both of these glycols with the polyoxytetramethylene glycol, it is also possible to produce a homogeneous polyamide elastomer having such transparency that the haze value of a 1-mm thick sheet thereof is not more than 75%. Moreover, when the dicarboxylic acid is replaced in these methods by an aromatic tricarboxylic acid or tetracarboxylic acid which can form at least one imide ring, a homogeneous and transparent polyamide-imide elastomer can also be obtained.

A present inventive polyamide elastomer having polyester glycol soft segments can be produced by reacting caprolactam with a dicarboxylic acid and either a polyoxyalkylene glycol or an $\alpha,\omega$-dihydroxyhydrocarbon so that the amount ratio of dicarboxylic acid residues to glycol residues in the resulting polymer may be substantially 1:2, thereby preparing a polyamide having a glycol residue attached through an ester linkage to each end of the molecule (hereinafter this polyamide is referred to as triblock), and condensing this triblock with a $C_4$–$C_{20}$ dicarboxylic acid.

When the glycol is used excessively for reacting with the dicarboxylic acid in the preparation of triblock, an excess of the glycol remains unreacted and will form a polyester containing at least three glycol residues connected through dicarboxylic residues. This is undesirable in respect to the control of elastomer properties.

On the other hand, when the dicarboxylic acid is used excessively, multiblocks containing five or more block units in the molecule will form besides the triblock. This is also undesirable in respect to the control of elastomer properties.

According to the method of producing a triblock by reacting a glycol with a polyamide-dicarboxylic acid which is prepared in advance by reacting a dicarboxylic acid with caprolactam, no uniform triblock can be obtained since both the reactants having poor miscibility with each other react together in separated phases. Such a triblock, if reacted with a dicarboxylic acid will provide no transparent and strong elastomer.

Therefore, it is necessary in the present invention to cause the esterification and the polymerization with caprolactam to proceed simultaneously thereby preparing a homogeneous triblock, in order to produce a transparent and strong elastomer which is much effective in the improvement of polyacetals in impact resistance. If caprolactam polymerizes preferentially or the esterification takes place preferentially, coarse phase separation will occur during polymerization, yielding only a low-transparent, nonuniform triblock.

For the purpose of preparing a uniform triblock, it is advisable to subject the above-said ingredients: caprolactam, dicarboxylic acid, and glycol to melt dehydration-condensation in the temperature range of 150° to 300° C., preferably 180° to 280° C. The reaction needs to be carried out while removing the forming water out of the reaction system to maintain the water content of the system within the range of from 0.1 to 1.0% by weight, in order to cause the esterification simultaneously with the polymerization of caprolactam and control the rate of each, thereby providing a transparent and homogeneous triblock. When the water content exceeds 1.0% by weight, the polymerization of caprolactam takes place preferentially and coarse phase separation occurs. On the other hand, when the water content is less than 0.1% by weight, the esterification proceeds preferentially, caprolactam scarcely reacts, and hence the triblock of desired composition cannot be obtained. Further, preferable water contents within the above defined range are chosen according to properties desired for the triblock.

In the preparation of this triblock, control of the water content in the reaction system is important. If desired, the water content in the reaction system may be decreased as the reaction proceeds. This control of the water content can be accomplished by proper choice of reaction conditions, for example, reaction temperature, flow of inert gas introduced, degree of pressure reduction, and structure of reaction vessel. After the dehydration-condensation has been carried out as stated above, the unreacted caprolactam is removed to yield a triblock. A preferred method for removing the unreacted caprolactam is heating the reaction product mixture under reduced pressure to evaporate away the caprolactam. If desired, the residue after caprolactam removal by evaporation is further heated at a temperature of 200° to 300° C., preferably 230° to 280° C., to esterify a slight amount of remaining carboxy groups, whereby a more homogeneous triblock can be obtained. Much remaining carboxy groups are undesirable since these carboxy groups react with the triblock, thereby causing variation in properties of the triblock. The amount of remaining carboxy groups is desirably up to 10 equivalents %, preferably up to 5 equivalents %, based on the charged carboxy groups.

When the above stated aromatic tricarboxylic acid or aromatic tetracarboxylic acid is used in place of the dicarboxylic acid in the triblock preparation, a homogeneous and transparent polyamide-imide elastomer can be obtained which has polyester glycol soft segments.

In these methods, esterification catalysts can be used as polymerization accelerators. Preferred examples of said catalysts include phosphoric acid, tetraalkyl ortho titanates such as tetrabutyl ortho titanate, tetraalkyl ortho zirconates such as tetrabutyl ortho zirconate, tin compound catalysts such as dibutyltin oxide and dibutyltin laurate, manganese compound catalysts such as manganese acetate, and lead compound catalysts such as lead acetate. The catalyst may be added in the initial stage of polymerization or in the middle stage of polymerization.

For the purpose of enhancing the heat stability of the polyamide elastomer used in the present invention, various stabilizers such as thermalage resistors and antioxdants can be used. These stabilizers may be added in any stage, initial, middle, or last, of polymerization or when the elastomer is blended with polyacetals. Suitable heat stabilizers include; various hindered phenols, e.g. N,N'-hexamethylene-bis (3,5-di-tert-butyl-4-hydroxycinnamamide, 4,4'-bis(2,6-di-tert-butylphenol), and 2,2'- methylene-bis(4-ethyl-6-tert-butylphenol); aromatic amines, e.g. N,N'-bis($\beta$-naphthyl)-p-phenylenediamine, N,N'-diphenyl-p-phenylenediamine, and poly(2,2,4-trimethyl-1,2-dihydroquinoline; copper salts, e.g. copper chloride and copper iodide; sulfur compounds, e.g. dilauryl thiodipropionate; and phosphorus compounds.

Blending proportions of the polyacetal and the polyamide elastomer in the present inventive composition need to be 70–97% by weight and 30–3% by weight, respectively, based on the total weight of these two components. When the proportion of the elastomer is less than 3% by weight, the impact resistance improving effect intended according to the present invention will not be exhibited sufficiently and the stretched and oriented material will not have adequate surface activity. When this proportion exceeds 30% by weight, the stiffness of the composition will be markedly lowered.

When the blending proportions of components (A) and (B) are within the above defined range, the composition can attain the intended surface activity, high modulus of at least 10 GPa, and high strength, though the proportion of component (B) is preferably in the range of 30 to 5 % by weight.

The polyacetal composition of the present invention is prepared desirably by melt mixing. The melt mixing can be carried out by known means, e.g. Banbury mixers, mixing rolls, and single-screw or twin-screw extruders, generally at temperatures of 150° to 230° C.

It is possible to incorporate into the polyacetal composition of the present invention other ingredients, e.g. pigments, dyes, reinforcing agents, fillers, heat stabilizers, antioxidants, nucleating agents, lubricants, plasticizers, antistatic agents, mold release agents, and other polymers, in an optional step such as the mixing step or molding step.

The thus obtained polyacetal composition of the present invention can be molded by known methods commonly used for molding thermoplastic resins, e.g. injection molding and extrusion molding.

The stretched and oriented material of the present invention needs to have a tensile modulus of at least 10 GPa. When an acetal homopolymer is used as component (A), the stretched and oriented material having a lower tensile modulus than 10 GPa will exhibit a lower tensile strength than 1.0 GPa, which is inadequate for practical use in various applications. The stretched and oriented material with a tensile modulus of 20 to 60 GPa will have a tensile strength in the range of 1.1 to 2.0 GPa, being desirable. In particular, the material with a tensile modulus of 30 to 60 GPa will have a tensile strength in the range of 1.2 to 2.0 GPa, hence being preferable. On the other hand, when an polyacetal copolymer is used as component (A), the stretched and oriented material is desired to have a tensile modulus of at least 10 GPa and a tensile strength of at least 0.7 GPa.

The density ratio which is defined as the ratio (%) of the apparent density of a polyacetal material after stretch to that before stretch indicates the compactness of the stretched material. The higher density ratio is the more desirable, since the stretched material is the more compact and its transverse strengths such as the knot strength, hook strength, and buckling strength are the higher. On the contrary, the lower density ratio is the more undesirable since the stretched material has the more voids and the higher tendency to fibrillation. When the density ratio is extremely low, the strength of such a stretched material is markedly low, its napping and buckling are liable to take place, and its chemical resistance, heat resistance, and weather resistance are also low.

The density ratio of the stretched material of the present invention is generally at least 85%, preferably at least 90%, particularly preferably at least 100%. The stretched material having a density ratio of at least 100% is highly transparent and has practically no structural defect. Moreover, the stretched material having a tensile modulus of 30 to 55 GPa and a density ratio of at least 100% is particularly preferable because it has a highly ordered, nearly-completely extended chain structure.

Further, the stretched material of the present invention has high knot strength and hook strength and is superior in adhesive strength. Its hook strength is generally in the range of from 0.4 to 0.7 GPa and its adhesive strength to rubbers is generally in the range of from 0.3 to 0.7 kg/mm$^2$, which is above twice the adhesive strength of conventional polyacetal materials.

As stated above, the stretched material of the present invention has a high tensile modulus and a high tensile strength and additionally high transverse strengths and in particular, much higher surface activity than that of conventional polyacetal materials. In a stretched resin-elastomer blend, the elastomer normally does not contribute to the tensile modulus or the tensile strength; the value of each property is rather lowered at least in proportion to the elastomer content. However, contrary to such expectation, no substantial deterioration of these properties has been observed even when the content of the present polyamide elastomer is as high as 10% by weight. The reason for this is not clear at present. Since the elastomer as component (B) is present in the form of fine dispersion in the polyacetal and the stretched material exhibits transparency, the elastomer is oriented linear form in the stretch direction without disturbing the higher-order orientation of the polyoxymethylene. Moreover, the amide linkage of the elastomer is highly polar and hydrophilic. These properties are exhibited effectively only after the elastomer has been oriented in linear form as stated above. Thereby, high ability to adhere to other materials is conceivably provided to the stretched and oriented material.

It is practical to produce the stretched material of the present invention by stretching an unstretched material consisting mainly of the present polyacetal composition. This unstretched material is prepared, for instance, by mixing pellets of the polyamide elastomer with pellets of the polyacetal, melt-extruding these mixed pellets by using a screw extruder, and winding up the extrudate after cooling. Thus, a uniformly compounded material having good stretchability can be obtained.

However, the stretched material of the present invention can be produced by other methods depending upon the end use of the material. For example, the method (Japanese Patent Application Kokai No. 60-183122) proposed previously by the present inventors can be used, which comprises stretching such an unstretched material as stated above at a high draw ratio while passing the material through a pressurized fluid to apply pressure to the material and heating it at a temperature not exceeding its softening point. According to this method, the stretch can be carried out under a uniform pressure at a uniform temperature and the applied pressure permits yielding a stretched material having a compact and dense texture, high transverse strength as well as a high modulus and high strength.

Figure 1:
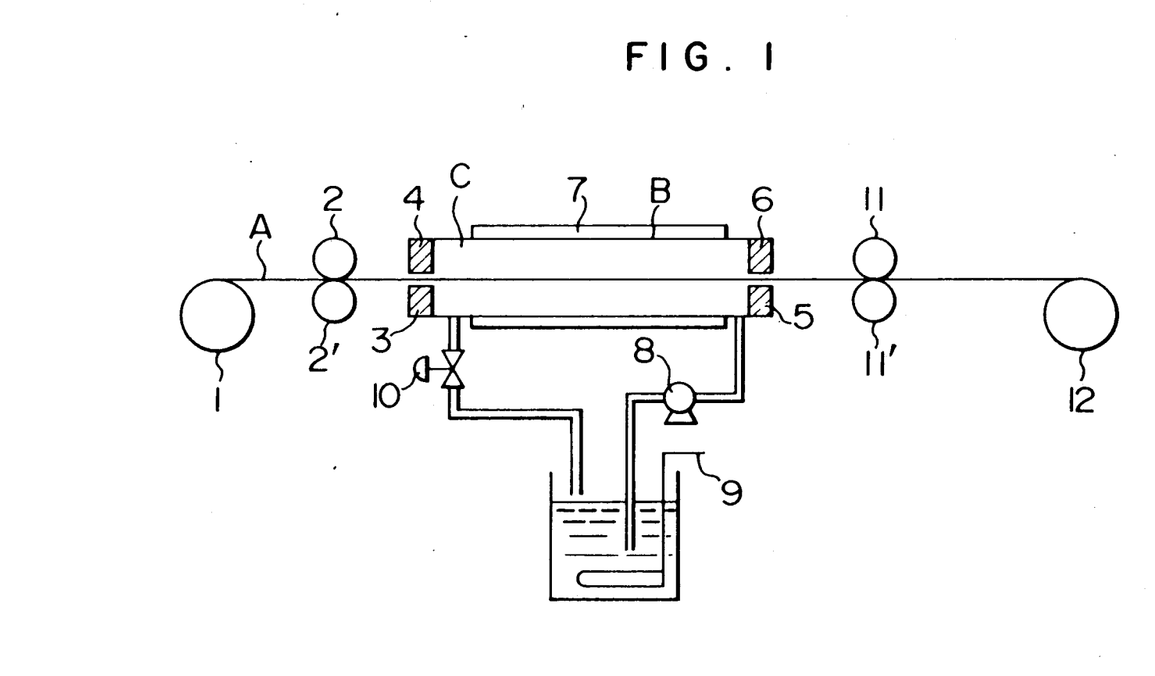
The accompanying drawing is a schematic view of an example of assemblies for producing the stretched and oriented polyacetal-based material of the present invention. Signs in the drawing denote the following: A: Lengthy stock; B: Stretcher; C: Pressurized fluid; 1: Unwinding roller; 2, 2': Feed rolls; 3, 4, 5, 6: Seals; 7: Heat insulator; 8' Pump; 9: Heater; 10: Control valve; 11, 11': Pull rolls; 12: Winder.

Referring to the accompanying drawing which shows a stretching apparatus for use to produce the stretched material, an embodiment of the production is given below. A lengthy stock (A) of the polyacetal composition, during continuous passage through a heated and pressurized fluid (C) filled in a stretcher (B), is stretched by rotating pull rolls 11 and 11' at a higher peripheral speed than that of feed rolls 2,2' while the stock receives isotropic pressure from the surrounding fluid, and the stretched product is taken up. Both the ends of the stretcher (B) fitted with seals 3, 4 and 5, 6 severally which allow the lengthy stock and the stretched material to pass smoothly but brings about no drop in the internal pressure of the stretcher (B). The pressure is controlled with a pressure control valve 10.

Desired properties can be imparted to the stretched material of the present invention by incorporating suitable additives or fillers as occasion demands. Such additives include, for example, ultraviolet absorbers, antioxidants, heat stabilizers, flame retardants, oils, lubricants, plasticizers, antistatic agents, colorants, and softening agents and such fillers include, for example, carbon black, whiskers, carbon fiber, glass fiber, aramid fiber, ceramics, and polyvinylidene fluoride.

The polyacetal composition of the present invention has superior impact strength and a high flexural modulus and additionally has high gloss, hence being able to provide molded articles having good appearance. Having such characteristics, the present polyacetal composition is favorably used for various applications, for example, in the areas of electronic, electrical machinery, and automobiles, machines, and office automation appliances.

The polyacetal stretched material of the present invention has a high tensile modulus, high tensile strength, and high density and is superior in knot strength, hook strength, buckling strength, flexural strength, impact strength, adhesive properties, and surface activity and good in various other properties such as flexural fatigue resistance, durability, creep resistance, low elongation, S—S properties, dimensional stability, thermal shrink resistance, low coefficient of linear expansion, heat resistance, chemical resistance, sea water resistance, solvent resistance, hot water resistance, weather resistance, corrosion resistance, cryogenic temperature resistance, low coefficient of friction, shapability, safety, and cleanness. In addition, this stretched material can be processed into articles of optional shapes such as round rods, square rods, special-shaped products, tubes, sheets, tapes and yarns. Therefore, the present stretched material may be used over a wide variety of fields wherein products of high modulus and high strength are necessary. Possible applications of the present stretched material include, for example, ropes, cables, tension members of optical fibers, wire ropes such as aerial wires, substitutes for cables; knitted or woven fabrics such as fishing nets, other various nets, tents, sails, filter cloths, canvas and apparel; sporting or hobby goods such as gut, fishing lines, handicraft materials, and art flowers; information or communication purpose materials such as base materials for recording tapes; materials for composites with rubbers such as tire cords, bead wires, padding (reinforcements) for belts, hoses, and pipes; civil engineering or building materials such as reinforcements for concrete, form works for concrete shield construction, and geogrid; rubber-, concrete-, or plastic-composite materials represented by honeycombs, skis, fishing rods, base boards for printed circuits, and various fiber-reinforced sheets and plates; and materials for other composites with paper, wood, ceramics, leather, glass, or metals.

The present invention is illustrated in more detail with reference to the following examples which are not intended to imply any restriction on the invention.

Properties of compositions and elastomers were determined according to the following methods.

(1) Tensile strength and tensile elongation

In accordance with ASTM D638, measurements were made on dumbbell specimens (⅛ thick for compositions, 1 mm thick: for elastomers) in the bone-dry state.

(2) Flexural modulus

In accordance with ASTM D790, measurements were made on ⅛ thick specimens in the bone-dry state.

(3) Izod impact strength

In accordance with ASTM D256, measurements were made on notched specimens ⅛ inch thick in the bone-dry state at 23° C.

(4) Relative gloss

In accordance with ASTM D523 the gloss of each sample was measured, and the found gloss was represented by the value (%) relative to the gloss of a control polyacetal resin.

(5) Relative viscosity of elastomer

Measured in m-cresol at a concentration of 0.5 wt/vol % at 30° C.

(6) Haze value of elastomer

In accordance with ASTM D 1003, measurements were on 1-mm thick sheets by using a haze meter.

(7) Thermal decomposition temperature of elastomer

The weight loss initiation temperature was determined by using a differential thermobalance at a heating speed of 10° C./min.

(8) Polyamide partition ratio of elastomer

A 1-mm thick elastomer sheet was divided into line pieces. About 1 g of the pieces taken as a test specimen were added to 100 ml of a solvent (selected from those cited before). The mixture was stirred at 25° C. for 3 hours, and the dissolved portion and the undissolved portion were separated from each other by centrifugation or filtration. Then, H¹-NMR measurement was made on each portion in a phenol-dutero-chloroform mixture (phenol 10 wt %). The polyamide content in each portion was determined from the ratio of the absorbance at 3.3-3.4 ppm due to the methylene group adjoining to oxygen atoms in the polyoxytetramethylene glycol segments to the absorbance at 2.0-2.1 ppm due to the methylene groups adjoining to carbonyl groups in the polycapramide segments. Then the polyamide partition ratio was determined from the following equation:

$$\text{Polyamide partition ratio} = \frac{\text{Polyamide content of dissolved portion}}{\text{Polyamide content of undissolved portion}}$$

A hexafluoroisopropanol-methanol mixture, when used as a solvent for the partition, was used in an amount of 50 ml.

Properties of stretched materials were determined according to the following methods.

(1) Tensile modulus, tensile strength, and hook strength

In accordance with JIS K7113 (1981), measurements were made by using a tensile testing machine (Instron Co.). The tensile modulus was measured by a differential trans-strain gage system. The tensile strength was measured by winding a specimen several turns on two fluted stainless steel reels separated by 20 cm from each other and pulling one of the reels at a speed of 10 cm/min.

(2) Density ratio

The apparent density before and after stretch was measured in accordance with the sink and float method of JIS K7112-1980 by using an aqueous solution of anhydrous potassium carbonate as a medium at 20°±0.5° C., and the density ratio was determined according to the following equation:

$$\text{Density ratio (\%)} = \frac{\text{Apparent density of material after stretch}}{\text{Apparent density of material before stretch}} \times 100$$

The apparent density before stretch was measured on a sample prepared by taking 1 g of a given stretched material in a 50-ml beaker, melting the material by heating it under a stream of nitrogen at about 190°-200° C. for 10 minutes, and allowing the material to cool to 20° C.

(3) Adhesive strength

The surface of a specimen was rubbed with a sand paper of #40. The specimen was dipped in hexafluoroisopropanol at room temperature for about 30 seconds and air-dried. An adhesive in which one end portion of the resulting specimen was inserted was hardened. The specimen was then withdrawn, where the stress was measured. The adhesive strength was determined as the found stress over the surface area of the inserted portion.

In the case of an epoxy adhesive, one end portion of the specimen was inserted in the adhesive in the form of a cylinder of 20 mm in outer diameter and 20 mm in length, and the epoxy resin was hardened in the air.

In the case of a rubber adhesive, the specimen rubbed similarly with a sand paper was dipped in hexafluoroisopropanol at room temperature for 30 seconds, then dipped further in an aqueous dispersion containing a resorcine-formalin latex prepared by the ordinary method, and was heat-treated at 160° C. One end portion of the treated specimen was inserted in a CF rubber (a synthetic rubber supplied by Asahi Chemical Industry Co.), a shape of 10 mm square was formed, the rubber was hardened by heating at 150° C. for 30 minutes, and then the specimen was withdrawn. The adhesive strength was calculated from the stress measured when the specimen was withdrawn.

In Examples, a stretcher as shown in the drawing and a similar stretcher were connected together in series to carry out a two-stage continuous stretch. A silicone oil was used as a fluid to be pressurized.

PREPARATION EXAMPLE 1

Preparation of polyamide elastomer (B-1)

A 5-liter stainless steel reactor equipped with a stirrer, a nitrogen inlet tube, and a distillate outlet tube was charged with 1050 g of a polyoxytetramethylene glycol (number average molecular weight 1980, $\overline{\text{Mvis}}/\overline{\text{Mn}} = 1.45$), 77 g of adipic acid, 540 g of caprolactam, 1.5 g of phosphoric acid, and 1.5 g of N,N'-hexamethylene-bis(3,5-di-tert-4-hydroxycinnamamide) (an antioxidant supplied by Ciba-Geigy Corp. under the tradename of Irganox 1098). The polymerization was conducted at 260° C. for 4 hours while flowing nitrogen at a rate of 450 ml/min. Then, 3.0 g of tetraisopropyl orthotitanate and 3.0 g of poly(2,2,4-trimethyl-1,2-dihydroquinoline) (Tradename Nocrac 224: an antioxidant) were added, and the reactor was evacuated gradually at 260° C. to 1 Torr. Under this condition, the unreacted caprolactam was evaporated out of the reactor in 15 minutes. Then, the polymerization was allowed to proceed under reduced pressure at 260° C., yielding a pale yellow, transparent elastomer. Properties of the elastomer were as follows: Polyoxytetramethylene glycol content: 73 wt %, number average molecular weight of polyamide segments: 713, relative viscosity: 2.04, haze value: 35%, m.p.: 178° C., tensile strength: 380 Kg/cm$^2$, tensile elongation: 930%. During the polymerization; the conversions of caprolactam 1, 2, and 4 hours after initiation of the polymerization were 36, 38, and 60 %, respectively; the percentages of decrease in the acid value 1, 2, and 4 hours after initiation of the polymerization were 38, 55, and 98; and the water contents in the polymerization system 1, 2, and 4 hours after initiation of the polymerization were 0.5, 0.4, and 0.6 wt %, respectively.

The polyamide partition ratio of the elastomer was determined by placing 1 g of the elastomer in 100 ml of methanol, stirring the mixture for 3 hours, and centrifuging the mixture to separate the dissolved portion and the undissolved portion from each other. The proportion of the dissolved portion was 52 wt % and the polyamide contents of the dissolved portion and of the undissolved portion were 26 wt % and 29 wt %, respectively. Hence the polyamide partition ratio was 0.90.

PREPARATION EXAMPLE 2

Preparation of polyamide elastomer (B-2)

The same reactor as used in Preparation Example 1 was charged with 1365 g of a polyoxytetramethylene glycol (number average molecular weight 2040, $\overline{\text{Mvis}}/\overline{\text{Mn}} = 1.45$), 111 g of terephthalic acid, 490 g of caprolactam, 1.8 g of phosphoric acid, and 1.8 g of Irganox 1098. The polymerization was conducted at 260° C. for 4 hours while flowing nitrogen at a rate of 500 ml/min. Then, 3.6 g of tetraisopropyl orthotitanate and 3.6 g of Nocrac 224 were added, and the reactor was evacuated gradually at 260° to 1 Torr. Under this condition the unreacted caprolactam was evaporated out of the reactor in 20 minutes. Then, the polymerization was allowed to proceed under reduced pressure at 260° C. for 4 hours, yielding a pale yellow, transparent elastomer. Properties of this elastomer were as follows: Polyoxytetramethylene glycol content: 75 wt %, number average molecular weight of polyamide segments: 680, relative viscosity: 1.92, haze value: 32 %, m.p.: 183° C., tensile strength: 350 Kg/cm$^2$, and tensile elongation: 930%. During the polymerization; the conversions of caprolactam 1, 2, and 4 hours after initiation of the polymerization were 39, 54, and 70%, respectively; the percentages of decrease in the acid value 1, 2, and 4 hours after initiation of the polymerization were 43, 58, and 98, respectively; and the water contents in the polymerization system 1, 2, and 4 hours after initiation of the polymerization were 0.4, 0.4, and 0.2 wt %, respectively.

In the same manner as in Preparation Example 1, the polyamide partition ratio of this elastomer was determined by treatment with methanol. Results thereof were as follows: Proportion of dissolved portion: 52 wt %, Polyamide content in dissolved portion: 23 wt %, Polyamide content in undissolved portion: 26 wt %,
Polyamide partition ratio: 0.88.

PREPARATION EXAMPLE 3

Preparation of polyamide elastomer (B-3)

The same reactor as used in Preparation Example 1 was charged with 885 g of a polyoxytetramethylene glycol (number average molecular weight 1770, $\overline{Mvis}/\overline{Mn}=1.4$), 115 g of decane dicarboxylic acid, 1002 g of caprolactam, 1.8 g of phosphoric acid, and 1.8 g of Irganox 1098. The polymerization was conducted at 260° C. for 4 hours while flowing nitrogen at a rate of 450 ml/min. Then, 3.6 g of tetraisopropyl orthotitanate and 3.6 g of Nocrac 224 were added, and the reactor was evacuated gradually at 260° C. to 1 Torr. Under this condition the unreacted caprolactam was evaporated out of the reactor in 15 minutes. Then, the polymerization was allowed to proceed under reduced pressure at 260° C. for 3 hours, yielding a pale yellow, transparent elastomer. Properties of this elastomer were as follows: Polyoxytetramethylene glycol content: 55 wt %, number average molecular weight of polyamide segments: 1450, relative viscosity 1.79, haze value 47%, m.p.: 205° C., tensile strength: 530 Kg/cm$^2$, and tensile elongation: 720%. During the polymerization; the conversion of caprolactam 1, 2, and 4 hours after initiation of the polymerization were 36, 54, and 63%, respectively; the percentages of decrease in the acid value 1, 2, and 4 hours after initiation of the polymerization were 39, 55, and 98, respectively; and the water contents in the polymerization system 1, 2, and 4 hours after initiation of the polymerization were 0.4, 0.5, and 0.4 wt %, respectively.

The polyamide partition ratio of this elastomer was 0.92 (dissolved portion 47 wt %) as determined in the same manner as in Preparation Example 1 but using a 30:70 (by volume) formic acid-methanol mixture.

PREPARATION EXAMPLE 4

Preparation of polyamide elastomer (B-4)

The same reactor as used in Preparation Example 1 was charged with 524 g of a polyoxytetramethyleneglycol (number average molecular weight 990), 78 g of adipic acid, 1246 g of caprolactam, 1.2 g of phosphoric acid and 1.2g of Irganox 1098, and the polymerization was conducted at 260° C. for 4 hours while flowing nitrogen at a rate of 500 ml/min. Then, 2.4 g of tetraisopropyl orthotitanate and 2.4 g of Nocrac were added, and the reactor was evacuated gradually at 260° C. to 1 Torr. Under this condition the unreacted caprolactam was evaporated out of the reactor in 15 minutes. Then the polymerization was allowed to proceed under reduced pressure at 260° C. for 3.5 hours, yielding a pale yellow, transparent elastomer. Properties of this elastomer were as follows: Polyoxytetramethylene glycol content: 37 wt %, number average molecular weight of polyamide segments: 1630, relative viscosity: 2.03, haze value 58%, m.p.: 209° C., tensile strength: 650 Kg/cm$^2$, and tensile elongation: 53%. During the polymerization; the conversion of caprolactam 1, 2, and 4 hours after initiation of the polymerization were 36, 51, and 63%, respectively; the percentages of decrease in the acid value 1, 2, and 4 hours after initiation of the polymerization were 42, 60, and 98; and the water contents 1, 2, and 4 hours after initiation of the polymerization were 0.6, 0.5, and 0.4 wt %, respectively.

PREPARATION EXAMPLE 5

Preparation of polyamide elastomer (B-5)

The same reactor as used in Preparation Example 1 was charged with 874 g of a polyoxyethylene glycol (number average molecular weight 1530), 95 g of terephthalic acid, 531 g of caprolactam, 1.5 g of phosphoric acid, and 1.5 g of Irganox, and the polymerization was conducted at 260° C. and 300 Torr for 4 hours. Then, 1.5 g of tetrabutyl zirconate was added, and the reactor was evacuated gradually at 250° C. to remove the unreacted caprolactam. Further, the polymerization was allowed to proceed at 1 Torr for 3 hours, yielding a pale yellow, transparent elastomer. This elastomer contained 70 wt % of polyoxyethylene glycol and exhibited a relative viscosity of 1.85, haze value of 43 %, tensile strength of 285 Kg/cm$^2$ and tensile elongation of 870%.

PREPARATION EXAMPLE 6

Preparation of polyamide elastomer (B-6)

A 500-ml separable flask equipped with a stirrer, nitrogen inlet tube, and distillate outlet tube was charged with 41.4 g of caprolactam, 40 g of a polyoxytetramethylene glycol (number average molecular weight 1980), 40 g of a Polytail HA (Polyolefin glycol number average molecular weight 2200 Mitsubishi Chemical Industries Ltd.), 5.6 g of adipic acid, 0.13 g of N,N'-bis($\beta$-naphthyl)-p-phenylenediamide (a thermalage inhibitor: tradename: "Nacrac white"), and 0.13 g of phosphoric acid and the polymerization was conducted at 260° C. for 4 hours while flowing nitrogen at a rate of 30 ml/min. Then, 0.26 g of tetraisopropyl titanate was added, and 17.4 g of unreacted caprolactam was removed by evaporation at 1 Torr for 15 minutes. Further, the polymerization was allowed to preceed at 260° C. for 4 hours, yielding a pale yellow, transparent elastomer. This elastomer contained 72 wt % total amount of polyoxytetramethyleneglycol and polyolefin glycol and exhibited a relative viscosity of 1.78, haze value of 47%, tensile strength of 274 Kg/cm$^2$, and tensile elongation of 930 %. During the polymerization; the esterification yields 1, 2, and 4 hours after initiation of the polymerization were 61, 75, and 84 %, respectively; the conversions of caprolactam 1, 2, and 4 hours after initiation of the polymerization were 42, 40, and 58 %, respectively; and the water content in the polymerization system was 0.4–0.8 wt %.

PREPARATION EXAMPLE 7

Preparation of polyamide elastomer (B-7)

A polyamide elastomer containing 66 wt % of a polyoxytetramethylene glycol (number average molecular weight 2010, $\overline{Mvis}/\overline{Mn}=1.45$) was prepared according to the procedure of Preparation Example 1. This elastomer exhibited a relative viscosity of 1.95, haze value of 35%, tensile strength of 340 Kg/cm$^2$, and tensile elongation of 890%.

PREPARATION EXAMPLE 8

Preparation of polyamide-imide elastomer (B-8)

The same reactor was used in Preparation Example 1 was charged with 669 g of caprolactam, 126 g of trimellitic acid, 1206 g of a polyoxytetramethylene glycol (number average molecular weight 2010, $\overline{Mvis}/\overline{Mn}=1.45$), 5.4 g of Nocrac 224, and 1.8 g of phosphoric acid, and the polymerization was conducted at 260° C. for 4 hours while flowing nitrogen at a rate of 800 ml/min. The water contents in the polymerization system 1, 2, and 4 hours after initiation of the polymerization were 0.7, 0.4, and 0.3 wt %, respectively. Then, 5 g of tetrabutyl orthotitanate was added, and the reactor was evacuated gradually at 260° C., thereby evaporating away 202 g of unreacted caprolactam in 1 hour. Further, the polymerization was allowed to proceed for 4 hours under a vacuum of up to 1 Torr. The reaction product was taken out in strand form through a nozzle fitted in the bottom of the reactor, and was passed through water and wound up. Thus, a pale yellow, transparent elastomer was obtained.

This elastomer contained 67 wt % of polyoxytetramethylene glycol segments. The polyamide-imide segments were found to have a number average molecular weight (in terms of the number average molecular weight of polyamide-imide dicarboxylic acid) of 990. Properties of this elastomer were as follows: Relative viscosity: 1.94, m.p.: 200° C., Shore hardness: 81 A, tensile strength 380 Kg/cm² tensile elongation: 880 %, haze value 35%, thermal decomposition initiation temperature: 315° C., 10% weight loss temperature: 420° C., and 30% weight loss temperature: 445° C.

PREPARATION EXAMPLE 9

Preparation of polyamide-imide elastomer (B-9)

The same reactor as used in Preparation Example 1 was charged with 938 g of a polyoxyethylene glycol (number average molecular weight 1970), 262 g of caprolactam, 100 g of trimellitic acid, 1.3 g of phosphoric acid, and 5.4 g of Irganox 1098. Then the reaction was conducted according to the procedure of Preparation Example 1 except that the reactor was evacuated to a reduced pressure of 210 mm Hg instead of the introduction of nitrogen, thereby yielding a transparent polyamide-imide elastomer in which polyamide-imide segments were found to have a number average molecular weight of 660 and the content of polyoxytetramethylene glycol segments was 75 wt %. Properties of this elastomer were as follows: Relative viscosity: 1.90, m.p.: 170° C., tensile strength: 230 Kg/cm², tensile elongation, 1050 %, haze value 37 %, thermal decomposition initiation temperature: 330° C., 10% weight loss temperature: 385° C., and 30% weight loss temperature: 406° C.

PREPARATION EXAMPLE 10

Preparation of polyamide-imide elastomer (B-10)

A 500-ml separable flask equipped with a stirrer, nitrogen inlet tube, and distillate outlet tube was charged with 120 g of a polyoxyethylene glycol number average molecular weight 1010), 22.8 g of trimellitic anhydride, 71.2 g of caprolactam, 0.21 g of phosphoric acid, and 0.21 g of an antioxidant (Nocrac 224), and the polymerization was conducted at 260° C. for 6 hours while flowing nitrogen at a rate of 50 ml/min. Then, 0.4 g of tetrabutyl zirconate was added, and the unreacted caprolactam was evaporated away at 260° C. under reduced pressure. Further, the polymerization was allowed to proceed under the same conditions for 3 hours, yielding a pale yellow, transparent elastomer. Characteristics of this elastomer were as follows: Content of polyoxyethylene glycol segments: 61 wt %, number average molecular weight of polyamide-imide segments: 640, haze value 30%, tensile strength: 190 Kg/cm², tensile elongation 950%, relative viscosity 1.90, m.p.: 150° C., thermal decomposition initiation temperature: 330° C., 10% weight loss temperature 401° C., and 30% weight loss temperature: 420° C.

PREPARATION EXAMPLE 11

Preparation of polyamide-imide elastomer (B-11)

The same separable flask as used in Preparation Example 10 was charged with 59.2 g of caprolactam, 100 g of a polyoxytetramethylene glycol (number average molecular weight 2040, $\overline{Mvis}/\overline{Mn}=1.45$) 10.7 g of pyromellitic anhydride, 0.15 g of phosphoric acid, and 0.2 g of an antioxidant (Nocrac 224), and the polymerization was conducted at 260° C. for 4 hours while flowing nitrogen at a rate of 50 ml/min. The water content in the reaction system under polymerization was 0.2–0.5 wt %. Then, 0.3 g of tetraisopropyl orthotitanate was added, and the flask was evacuated gradually at 260° C., thereby evaporating away the unreacted caprolactam. Further, the polymerization was allowed to proceed for 5 hours at 1 Torr, yielding a pale yellow, transparent elastomer. Characteristics of this elastomer were follows: Content of polyoxytetramethylene glycol: 71 wt %, number average molecular weight of polyamide-imide segments: 830, haze value: 43 %, Shore hardness 85A, tensile strength: 310 Kg/cm², tensile elongation: 1030 %, relative viscosity: 2.28, m.p.: 214° C., thermal decomposition initiation temperature: 337° C., 10% weight loss temperature: 438° C., and 30% weight loss temperature: 451° C.

PREPARATION EXAMPLE 12

Preparation of polyamide-imide elastomer (B-12)

A vessel equipped with a stirrer and a reflux condenser was charged with 600 g of tetrahydrofuran (THF) and 25.5 g of ethylene glycol. Then, 300 g of tangustophosphoric acid ($H_3PW_{12}O_{40}$) which had been brought into anhydrous form by heating at 250° C. for 3 hours ( the molar ratio of ethylene glycol to tangustophosphoric acid was about 4:1) was added with stirring. After stirring was continued for 4 hours at 60° C., the mixture was allowed to stand at room temperature and separate into two layers. The unreacted THF was removed from the upper layer by distillation, yielding 126 g of a transparent viscous polymer. $^1$H-NMR (400 MHz) and $^{13}$C-NMR (400 MHz) measurements indicated that this polymer is a polyether glycol, i.e. a copolymer of ethylene glycol/THF in a molar ratio of 1/9, wherein ethylene glycol units are aligned not in block form but at random. From the result of measuring the hydroxy group value, this polymer was found to a number average molecular weight of 1500. The melting point of this polymer was 14° C.

The same separable flask as used in Preparation Example 10 was charged with 75 g of the above modified polyoxytetramethylene glycol, 10.5 g of trimellitic acid, 85 g of caprolactam, and 0.3 g of an antioxidant (Nocrac 224), and the polymerization was conducted according to the procedure of Preparation Example 3, yielding a transparent polyamide-imide elastomer. Characteristics of this elastomer were as follows: Relative viscosity: 1.85, number average molecular weight of polyamide-imide segments: 1230, content of glycol segments: 55 wt %, haze value: 43 %, tensile strength: 320 Kg/cm², tensile elongation: 870 %, and thermal decomposition initiation temperature: 311° C.

PREPARATION EXAMPLE 13

Preparation of polyamide-imide elastomer (B-13)

The same separable flask as used in Preparation Example 10 was charged with 160 g of Polytail HA (number average molecular weight 2200), 15.1 g of trimellitic acid, 50 g of caprolactam, and 0.2 g of an antioxidant (Nocrac 224), and the polymerization was conducted at 260° C. for 3 hours while flowing nitrogen at a rate of 100 ml/min. Then, 0.4 g of tetraisopropyl orthotitanate was added, and the flask was evacuated gradually to evaporate away the unreacted caprolactam. Further, the polymerization was allowed to proceed for 1 hour at 1 Torr, yielding a transparent polyamide-imide elastomer. Characteristics of this elastomer were as follow: Content of polyolefin glycol segment: 75 wt %, number average molecular weight of polyamide-imide segments: 730, haze value: 37 %, relative viscosity 1.73, tensile strength: 120 Kg/cm$^2$, and tensile elongation 30 %.

PREPARATION EXAMPLE 14

Preparation of polyamide elastomer (B-14)

A 1-liter separable flask equipped with a stirrer, nitrogen inlet tube, and distillate outlet tube was charged with 408 g of a polyoxytetramethylene glycol (number average molecular weight 2040, $\overline{Mvis}/\overline{Mn}=1.45$), 14.6 g of adipic acid, 150 g of caprolactam, 0.5 g of phosphoric acid, and 0.5 g of Irganox 1098, and the polymerization was conducted at 260° C. for 4 hours while flowing nitrogen at a rate of 130 ml/min. The water content in the polymer (triblock) 2 and 4 hours after initiation of the reaction were 0.7 and 0.5 wt %, respectively. Then, 0.5 g of tetraisopropyl orthotitanate was added, and the polymerization was allowed to proceed for 1 hour while removing unreacted caprolactam under reduced pressure, thereby yielding a triblock which contained polyamide segments having a number average molecular weight of 970. The relative viscosity of the triblock in m-cresol (0.5 wt/vol %) at 30° C. was 1.28.

The same separable flask as used in Preparation Example 10 was charged with 150 g of the above triblock, 6.6 g of decanedicarboxylic acid, and 0.2 g of Nocrac 224, and the polymerization was conducted at 260° C. for 4 hours, yielding a transparent soft elastomer. This elastomer was found to contain 18 wt % of polyamide segments and exhibited a tensile strength of 320 Kg/cm$^2$, tensile elongation of 980 %, relative viscosity of 1.92, and haze value of 39 %.

PREPARATION EXAMPLE 15

Preparation of polyamide elastomer (B-15)

The same separable flask as used in Preparation Example 10 was charged with 75 g of the modified polyoxytetramethylene glycol prepared in Preparation Example 12, 4.3 g of cyclohexanedicarboxylic acid, 58 g of caprolactam, 0.1 g of phosphoric acid, and 0.1 g of Irganox 1098, and the reaction was conducted according to the procedure of Preparation Example 14 to connect triblocks through decanedicarboxylic acid units, thereby yielding a transparent elastomer. Characteristics of this elastomer were as follows: Number average molecular weight of polyamide segments: 700, tensile strength 240 Kg/cm$^2$, tensile elongation: 870 %, relative viscosity: 1.62, and haze value: 42 %.

PREPARATION EXAMPLE 16

Preparation of polyamide elastomer (B-16)

The same separable flask as used in Preparation Example 10 was charged with 102 g of a polyoxytetramethylene glycol (number average molecular weight 2040), 110 g of the Polytail HA, 10.1 g of sebacic acid, 74 g of caprolactam, 0.5 g of phosphoric acid, and 0.3 g of Irganox 1098. The polymerization was conducted according to the procedure of Preparation Example 1, thereby yielding a triblock which contained polyamide segments having a number average molecular weight of 1085. The water content in the polymerization under reaction was 0.4–0.7 wt %. 150 Gram of this triblock was reacted with 15.8 g of dimer acid (tradename versadyme, supplied by Henkel-Hakusui Co., Ltd.) at 1 Torr and 260° C. for 4 hours, yielding a transparent elastomer. This elastomer was found to contain soft segments having a number average molecular weight of 4600 and exhibited a tensile strength of 250 Kg/cm$^2$, tensile elongation of 920 %, relative viscosity of 1.85, and haze value of 45%.

PREPARATION EXAMPLE 17

Preparation of polyamide elastomer (B-17)

A 500-ml glass reaction vessel equipped with a stirrer, nitrogen inlet tube, and distillate outlet tube was charged with 150 g of a polyoxytetramethylene glycol (number average molecular weight 2040), 70.8 g of a polycapramide dicarboxylic acid (number average molecular weight 962) prepared from both adipic acid and caprolactam, 1.1 g of tetraisopropyl orthotitanate, and 0.44 g of Nocrac 224, and the polymerization was conducted at 1 Torr and 260° C. for 8 hours, yielding a milky white, opaque polymer which showed a haze value of 95%. This polymer exhibited a tensile strength of 100 Kg/cm$^2$ and an tensile elongation of up to 100% and was fragile. The polyamide partition ratio of this polymer was 0.36 (dissolved portion 46 wt %) as measured in methanol.

EXAMPLES 1–3

Polyacetal resin A-1 and polyamide elastomer B-2 were blended together in different ratios as shown in Table 1. Each blend was extruded through a twin-screw extruder set at an extrusion temperature of 195° C, and was passed through a cooling bath and pelletized. After being vacuum-dried at 80° C. for 4 hours, pellets of each group were injection molded under the following conditions to form test pieces for property measurements.

| Cylinder temperature | 200° C. |
|---|---|
| Injection pressure | 800 Kg/cm$^2$ |
| Injection period | 10 sec. |
| Cooling period | 10 sec. |
| Mold temperature | 90° C. |

Table 1 shows results of measuring properties of the formed test pieces. As can be seen from Table 1, all of these compositions in molded form have improved Izod impact strength, retain flexural modulus on high levels, and are superior in gloss.

For comparison, properties of polyacetal resin A-1 alone are also shown in Table 1. Polyacetal resin A-1 is the following commercial resin:

A-1: 37 Tenac 3010" (registered trademark of a polyacetal homopolymer made by Asahi Chemical Industry Co.)

ample 17. Results of evaluating properties of the test pieces are shown in Table 2.

TABLE 1

| Sample | Polyacetal resin | | Polyamide elastomer | | Tensile strength (Kg/cm$^2$) | Tensile Elongation (%) | Flexural modulus (Kg/cm$^2$) | Izod impact strength (Kg·cm/cm) | Tensile modulus (Kg/cm$^2$) | Relative gloss (%) |
|---|---|---|---|---|---|---|---|---|---|---|
| | Code | Blending proportion (part by wt) | Code | Blending proportion (part by wt) | | | | | | |
| Example 1 | A-1 | 95 | B-2 | 5 | 600 | 35 | 23600 | 14.6 | 25100 | 100 |
| Example 2 | " | 90 | " | 10 | 564 | 61 | 21800 | 20.1 | 24700 | 95 |
| Example 3 | " | 85 | " | 15 | 474 | 57 | 19100 | 18.8 | 21000 | 90 |
| Comparative Example | " | 100 | — | — | 690 | 15 | 27600 | 10.2 | 26100 | 100 |

EXAMPLES 4-13

According to the procedure of Example 1, test pieces were prepared from blends of polyacetal resin A-1 with individual polyamide elastomers B-1 and B-3 to B-7 and from a blend of polyacetal resin A-2 with polyamide elastomer B-1 by extrusion and injection molding. Found properties of these test pieces are shown in Table 2. Polyacetal resin A-2 is the following commercial resin:

A-2: "Tenac-C 3510" (registered trademark of a polyacetal copolymer made by Asahi Chemical Industry Co.)

COMPARATIVE EXAMPLE 4

According to the procedure of Example 1, test pieces were prepared by blending polyacetal resin A-1 with a polyether-ester-amide elastomer (Diamide PAE E-40L, supplied by Daicel-Hüls Corp.) constituted of about 50 wt % of nylon-12 and 50 wt % of polyoxytetramethylene glycol, followed by extrusion and injection molding. Results of evaluating properties of the test pieces are shown in Table 2.

COMPARATIVE EXAMPLE 5

Properties of a polyacetal resin blend with a urethane elastomer (Delrin 100 ST, supplied by Du Pont de Nemours, E.I., & Co.) are shown in Table 2.

TABLE 2

| | Polyacetal resin | | Polyamide elastomer | | Tensile strength (Kg/cm$^2$) | Tensile strength (%) | Flexural modulus (Kg/cm$^2$) | Izod impact strength (Kg·cm/cm) | Relative gloss (%) |
|---|---|---|---|---|---|---|---|---|---|
| | Code | Blending proportion (part by wt) | Code | Blending proportion (part by wt) | | | | | |
| Example 4 | A-1 | 95 | B-1 | 5 | 632 | 20 | 25400 | 14.5 | 100 |
| Example 5 | " | 90 | " | 10 | 590 | 20 | 23400 | 17.3 | 95 |
| Example 6 | " | 80 | " | 20 | 460 | 45 | 19400 | 20.2 | 85 |
| Example 7 | " | 75 | " | 25 | 410 | 50 | 17500 | 20.3 | 90 |
| Example 8 | " | 90 | B-3 | 10 | 570 | 35 | 23000 | 17.5 | 95 |
| Example 9 | " | " | B-4 | 10 | 625 | 26 | 22500 | 14.8 | 90 |
| Example 10 | " | " | B-5 | 10 | 580 | 52 | 21700 | 20.9 | 85 |
| Example 11 | " | " | B-6 | 10 | 540 | 46 | 21500 | 18.5 | 80 |
| Example 12 | " | " | B-7 | 10 | 580 | 25 | 23500 | 17.0 | 95 |
| Example 13 | A-2 | 90 | B-1 | 10 | 455 | 250 | 18500 | 12.0 | — |
| Compar. Example 1 | A-1 | 100 | — | — | 690 | 15 | 27600 | 10.2 | 100 |
| Compar. Example 2 | A-2 | 100 | — | — | 615 | 40 | 24000 | 7.5 | — |
| Compar. Example 3 | A-1 | 90 | B-17 | 10 | 515 | 31 | 21300 | 10.8 | 40 |
| Compar. Example 4 | A-1 | 90 | E-40L | 10 | 590 | 85 | 22800 | 12.0 | 90 |
| Compar. Example 5 | | Delrin ST 100 | | | 425 | 275 | 13000 | 84 | 70 |

COMPARATIVE EXAMPLES 1 AND 2

Properties of polyacetal resins A-1 and A-2 are shown in Table 2.

COMPARATIVE EXAMPLE 3

According to the procedure of Example 1, test pieces were prepared by blending polyacetal resin A-1 with polyamide elastomer B-17 obtained in Preparation Ex-

EXAMPLES 14-24

According to the procedure of Example 1, test pieces were prepared from blends of polyacetal resin A-1 (Tenac 3010) with individual polyamide elastomers from B-8 to B-15 and from blends of polyacetal resin A-2 (Tenac C 3510) with individual polyamide elastomers B-16, B-9, and B-11, followed by extrusion and injection molding. Found properties of these test pieces are shown in Table 3.

TABLE 3

| | Polyacetal resin | | Polyamide elastomer | | Tensile strength (Kg/cm²) | Tensile strength (%) | Flexural modulus (Kg/cm²) | Izod impact strength (Kg·cm/cm) | Relative gloss (%) |
|---|---|---|---|---|---|---|---|---|---|
| | Code | Blending proportion (part by wt) | Code | Blending proportion (part by wt) | | | | | |
| Example 14 | A-1 | 90 | B-8 | 10 | 575 | 35 | 23000 | 18.9 | 100 |
| Example 15 | " | " | B-9 | " | 545 | 38 | 22600 | 20.5 | 90 |
| Example 16 | " | " | B-10 | " | 550 | 35 | 23100 | 19.5 | 90 |
| Example 17 | " | " | B-11 | " | 570 | 41 | 22700 | 18.5 | 85 |
| Example 18 | " | " | B-12 | " | 580 | 37 | 23300 | 15.8 | 80 |
| Example 19 | " | " | B-13 | " | 553 | 33 | 21900 | 14.5 | 75 |
| Example 20 | " | " | B-14 | " | 550 | 33 | 21600 | 17.5 | 90 |
| Example 21 | " | " | B-15 | " | 570 | 42 | 20900 | 20.1 | 85 |
| Example 22 | A-2 | " | B-16 | " | 475 | 180 | 19500 | 13.5 | — |
| Example 23 | A-2 | " | B-9 | " | 475 | 170 | 19000 | 14.5 | — |
| Example 24 | A-2 | " | B-11 | " | 485 | 180 | 18700 | 13.5 | — |

EXAMPLE 25

For the purpose of examining antistatic effect, elastomers shown in Table 4 were blended separately with polyacetal resin A-1, pelletized, and injection molded to prepare test specimens. A voltage of 8KV d.c. was applied to each test specimen by using a static honest meter (supplied by Shishido & Co.) the voltage application was stopped, and the time for halving the charged potential was measured. Before testing, one group of test specimens were left standing in the air of 60-70% R.H. and another group of test specimens were dried in vacuo at 80° C. for 5 hours. The present inventive polyamide elastomer having polyoxyethylene glycol soft segments exhibited outstanding antistatic effect.

TABLE 4

| Elastomer | Soft segment | Elastomer content wt % | Time for halving potential sec. |
|---|---|---|---|
| B-5 | PEG | 10 | 2 |
| B-9 | PEG | 5 | 2.5 |
| B-9 | PEG | 10 | 1.2 |
| B-1 | PTMG | 10 | 10 |
| Diamide E40L | PTMG | 10 | 35 |
| — | — | — | 218 |
| B-5 | PEG | 10 | 2.5* |
| B-9 | PEG | 10 | 2* |
| — | — | — | 925* |

*Dried test specimens were used.

EXAMPLES 26-33 AND COMPARATIVE EXAMPLES 6-13

A blend of 5 parts by weight of polyamide elastomer B-7 obtained in Preparation Example 7 and 95 parts by weight of polyacetal resin A-1 was extruded through an extruder at 200° C., and quenched immediately with cold water of 10° C., forming unstretched tubes of 3.2-mm outer diameter and 1.0-mm inner diameter.

These tubes, in the first stage, were stretched at a draw ratio of 6:1 under the conditions of 130° C. temperature, 40 Kg/cm² pressure, and 1.25 min⁻¹ strain rate, and in the second stage, were stretched at varying draw ratios of 1.33:1 to 5.83:1 under the conditions of 170° C. temperature, 200 Kg/cm² pressure, and 0.02-0.32 min strain rate, thus yielding stretched fiber-like materials with different total draw ratios of 8:1 to 35:1.

For comparison, polyacetal resin A-1 alone (containing no elastomer consisting of a block copolymer) was extruded and stretched under the same conditions as stated above, yielding stretched fiber-like materials.

Properties of the stretched fiber-like materials were measured. Results of the measurement are shown in Table 5. The adhesive strength of Examples 26-33 shown in Table 5 are comparable to the tensile strength at break of rubbers.

TABLE 5

| | Draw ratio | Tensile modulus (GPa) | Tensile strength (GPa) | Hook strength (GPa) | Adhesive strength (Kg/mm²) | Density ratio (%) | Appearance |
|---|---|---|---|---|---|---|---|
| Example 26 | 8 | 10 | 1.0 | 0.45 | 0.64 | 100 | Transparent |
| Example 27 | 12 | 20 | 1.3 | 0.60 | 0.64 | 101.4 | Transparent |
| Example 28 | 15 | 30 | 1.5 | 0.63 | 0.64 | 102.1 | Transparent |
| Example 29 | 19 | 40 | 1.7 | 0.70 | 0.64 | 102.1 | Transparent |
| Example 30 | 21 | 42 | 1.7 | 0.65 | 0.64 | 102.1 | Transparent |
| Example 31 | 24 | 50 | 1.4 | 0.60 | 0.64 | 102.1 | Translucent |
| Example 32 | 28 | 55 | 1.2 | 0.53 | 0.64 | 97 | White |
| Example 33 | 35 | 60 | 1.0 | 0.40 | 0.64 | 85 | White |
| Compar. Example 6 | 8 | 10 | 1.0 | 0.33 | 0.32 | 100 | Transparent |
| Compar. Example 7 | 12 | 20 | 1.3 | 0.32 | 0.32 | 101.4 | Transparent |
| Compar. Example 8 | 15 | 30 | 1.5 | 0.32 | 0.32 | 102.1 | Transparent |
| Compar. | 19 | 40 | 1.7 | 0.32 | 0.32 | 102.1 | Trans- |

TABLE 5-continued

|  | Draw ratio | Tensile modulus (GPa) | Tensile strength (GPa) | Hook strength (GPa) | Adhesive strength (Kg/mm$^2$) | Density ratio (%) | Appearance |
| --- | --- | --- | --- | --- | --- | --- | --- |
| Example 9 |  |  |  |  |  |  | parent |
| Compar. Example 10 | 21 | 42 | 1.7 | 0.30 | 0.32 | 102.1 | Transparent |
| Compar. Example 11 | 24 | 50 | 1.4 | 0.30 | 0.32 | 102.1 | Translucent |
| Compar. Example 12 | 28 | 55 | 1.2 | 0.25 | 0.32 | 97 | White |
| Compar. Example 13 | 35 | 60 | 1.0 | 0.20 | 0.32 | 85 | White |

EXAMPLES 34–41 AND COMPARATIVE EXAMPLE 14

According to the procedure of Examples 26–33, stretched fiber-like materials were formed from polyacetal compositions containing severally polyamide elastomers shown in Table 6. Results of measuring properties of the stretched fiber-like materials are shown in Table 6. The fiber-like material of Comparative Example 14 could not be stretched up to a draw ratio of 20:1. Therefore, its properties shown in Table 6 are of the fiber-like material just before break, i.e. of the fiber-like material with a draw ratio of 15:1.

EXAMPLE 42

An unstretched tube (outer diameter 2.3 mm, inner diameter 0.8 mm) formed from a polyacetal composition containing 5 wt % of polyamide elastomer B-2 was stretched under pressure at draw ratios of 8:1 to 35:1 in the same manner as in Example 26–33, thereby yielding stretched polyacetal materials. These stretched materials were found to have tensile moduli of 10 to 60 GPa, tensile strengths of 1.0 to 1.8 GPa, hook strengths of 0.40 to 0.70 GPa, adhesive strengths of 0.6 to 0.7 Kg/mm$^2$, and density ratios of 85 to 102%, exhibiting tendencies similar to those of the stretched materials obtained in Examples 26–33.

cold water of 10° C., forming an unstretched tube of 3.2-mm outer diameter and 1.0-mm inner diameter. This tube, in the first stage, was stretched at a draw ratio of 6:1 under the conditions of 130° C. temperature, 40 Kg/cm$^2$ pressure, and 1.25 min$^{-1}$ strain rate, and in the second stage, was stretched at draw ratios of 1.33:1 to 5.00:1 under the conditions of 160° C. temperature, 200 Kg/cm$^2$ pressure, and 0.02–0.32 min$^{-1}$ strain rates, thereby yielding stretched fiber-like materials with total draw ratios of 8:1 to 30:1. For comparison, stretched fiber-like materials (Comparative Example 15) were formed from said polyacetal copolymer alone without blending any elastomer by stretching a unstretched tube of the polyacetal copolymer under the same conditions as stated above. Results of measuring properties of those stretched fiber-like materials showed that the stretched fiber-like materials of the present invention had tensile modulus of 10 to 30 GPa, tensile strengths of 0.7 to 1.2 GPa, hook strengths of 0.40 to 0.65 GPa, adhesive strengths of 0.6 to 0.7 Kg/mm$^2$, and density ratios of 85 to 102% while the stretched fiber-like materials of Comparative Example 15 had tensile modulus of 10 to 30 GPa, tensile strengths of 0.7 to 1.2 GPa, hook strengths of 0.4 to 0.5 GPa, adhesive strength of 0.3 Kg/mm$^2$, and density ratios of 85 to 102%. Dependencies of properties on draw ratio were similar to those in the case of the acetal homopolymer compositions of Examples 26–30.

TABLE 6

|  | Elastomer No. | Elastomer content (wt %) | Draw ratio | Tensile modulus (GPa) | Tensile strength (GPa) | Hook strength (GPa) | Adhesive strength (Kg/mm$^2$) | Density ratio (%) | Appearance |
| --- | --- | --- | --- | --- | --- | --- | --- | --- | --- |
| Example 34 | B-7 | 3 | 21 | 42 | 1.7 | 0.40 | 0.64 | 102 | Transparent |
| Example 35 | " | 10 | 21 | 42 | 1.7 | 0.65 | 0.64 | 102 | Transparent |
| Example 36 | " | 30 | 21 | 28 | 1.2 | 0.55 | 0.64 | 102 | Transparent |
| Example 37 | B-2 | 5 | 21 | 39 | 1.6 | 0.60 | 0.64 | 102 | Transparent |
| Example 38 | B-3 | 5 | 21 | 42 | 1.7 | 0.63 | 0.60 | 102 | Transparent |
| Example 39 | B-8 | 5 | 21 | 42 | 1.7 | 0.65 | 0.64 | 102 | Transparent |
| Example 40 | B-10 | 5 | 21 | 42 | 1.7 | 0.65 | 0.68 | 102 | Transparent |
| Example 41 | B-14 | 5 | 21 | 36 | 1.5 | 0.58 | 0.60 | 102 | Transparent |
| Compar. Example 14 | B-7 | 60 | 15 | 6 | 0.7 | 0.30 | 0.30 | 100 | Transparent |

EXAMPLE 43 AND COMPARATIVE EXAMPLE 15

5 Parts by weight of pellets of polyamide elastomer B-7 and 95 parts by weight of pellets of an acetal copolymer (Duracon M 25-04, supplied by Polyplastic Co., Ltd.) were blended together, extruded through an extruder at 190° C., and quenched immediately with

EXAMPLE 44 AND COMPARATIVE EXAMPLE 16

Using specimens of the stretched fiber-like materials of Example 30 and Comparative Example 10, their strengths of adhesion to an epoxy resin (supplied by Showa Kobunshi Co., Ltd. under the registered trademark of Araldite Rapid) were measured according to the method stated before. The stretched fiber-like material of the present invention exhibited an adhesive strength of 1.45 Kg/mm² and the stretched fiber-like material of the comparative example exhibited an adhesive strength of 1.35 Kg/mm². Both the adhesive strengths are comparable to the tensile strength at break of rubbers.

EXAMPLE 45

Ten parts by weight of pellets of polyamide elastomer B-7 and 90 parts by weight of pellets of polyacetal resin A-1 were blended together and extruded through an extruder at 200° C. to give an unstretched tube of 4.6-mm outer diameter and 1.5-mm inner diameter. Then the tube was stretched under pressure at a draw ratio of 20:1 to give a stretched monofilament having a diameter of 1.0 mm, a tensile modulus of 40 GPa, a tensile strength of 1.7 GPa and an elongation of 6 to 8%. The stretched monofilament thus obtained was continuously sand-blasted with alumina (of average particle size 74 μm), immersed in a RF solution containing 40% by weight of resorcinol at 23° C. for 10 seconds, subjected to the dry heat treatment at 160° C. for 20 seconds, immersed in a RFL solution at 23° C. for 10 seconds and subjected to the dry heat treatment at 165° C. for 5 minutes.

Then one end of the monofilament thus obtained was embedded by 10 mm in the mixed raw rubber for the carcass of automobile tires and subjected to the heat treatment at 150° C. under a press pressure of 35 Kg/cm² for 30 minutes by a heat press machine to give a test piece. In accordance with the A method (T test) of JIS L-1017 (1983), with the test piece the drawing force at drawing the embedded monofilament out of the rubber was measured and then the adhesive strength was calculated according to the following equation;

$$\text{Adhesive strength} = \frac{\text{drawing force(g)}}{\pi \times 1.0 \text{ (monofilament diameter: mm)} \times 10 \text{ (embedded length: mm)}}$$

As the result, the adhesive strength of the monofilament was 1340 g/mm².

The RF solution and the RFL solution as employed in the above were prepared as follows;

RF solution was prepared by mixing 16.2 parts by weight of resorcinol, 20.0 parts by weight of 37% aqueous formaldehyde solution, 0.41 part by weight of sodium hydroxide and 373.8 parts by weight of water and stirring the resultant mixture at 23° C. for 6 hours.

RFL solution was prepared by adding 282.2 parts by weight of vinylpyridine terpolymer latex (product of Sumitomo Naugatuck Co., Ltd., trademark "PYRATEX"), 43.3 parts by weight of styrene-butadiene rubber latex (product of Nippon Zeon Co., LTD., "J-9049"), 11.8 parts by weight of natural rubber latex (product of HMPB, "H & C") and 233.3 parts by weight of water to the entire RF solution as obtained above, stirring the mixture at 23° C. for 24 hours and adding 18.0 parts by weight of a 28% by weight aqueous ammonia solution.

EXAMPLE 46

The same stretched monofilament treated with the RF solution and the RFL solution in Example 45 was subjected to relaxation at 165° C. for 3 minutes, coated with mixed raw rubber for the carcass of an automobile type, wound quintuple on a drum having a diameter of 588 mm so as to prepare a bead for a bicycle tire. A bicycle tire was prepared in a tire molding machine by using said bead. After vulcanization, the finished bicycle tire was obtained. The tensile strength of the bead portion of the tire was 574 Kg which was 85% of the tensile strength of 5 stretched monofilaments. The bead completely adhered to the rubber.

What is claimed is:

1. A polyacetal composition comprising
(A) 70–97% by weight of a polyacetal and
(B) 30–3% by weight of a transparent polyamide elastomer represented by the general formula wherein, G denotes a radical remaining after removal of the hydroxy groups from at least one glycol selected from a polyoxyalkyleneglycol or α,ω-dihydroxyhydrocarbon having a number average molecular weight of 500 to 4000, or a polyester composed of said polyoxyalkyleneglycol or said α,ω-dihydroxyhydrocarbon and a C₄₋₄₀ dicarboxylic acid; said polyester having a number average molecular weight of 1000 to 8000 and hydroxy groups at both ends, PA denotes a radical remaining after removal of the carboxyl groups from a polycapramide-imide with terminal carboxy groups having a number average molecular weight of 400 to 3000 and one or two imide rings in the molecule which is formed from both caprolactam and an aromatic tricarboxylic acid capable of forming one imide ring or an aromatic tetracarboxylic acid capable of forming two imide rings in a substantially equimolar amount to said G, the polyamide elastomer exhibiting a relative viscosity of at least 1.5 in m-cresol at a polymer concentration of 0.5 g/dl at 30° C., a 1-mm thick sheet of the polyamide elastomer having a haze value of not more than 75%, and the ratio by weight of said glycol to said polycapramide-imide with carboxyl groups being 90:10 to 35:65.

2. The polyacetal composition of claim 1, wherein the polyamide elastomer is formed from segments of polycapramide-imide with carboxyl groups having a number average molecular weight of 400 to 3000 and polyester segments having a hydroxy group at each end, having a number average molecular weight 1000 to 8000 and is produced by dehydration-condensation of a C₄–C₄₀ dicarboxylic acid with either a polyoxyalkylene glycol or α,ω-dihydroxyhydrocarbon having a number average molecular weight of 500 to 4000 in a molar ratio of substantially 1:2.

3. The polyacetal composition of claim 1, wherein the polyamide elastomer is produced by using as the glycol ingredient a polyoxyethylene glycol, polyoxytetramethylene glycol, oxyalkylene-modified polyoxytetramethylene glycol, α,ω-dihydroxyhydrocarbon or a mixture of these glycols.

4. The polyacetal composition of claim 1, wherein the polyamide elastomer is a polycapramide-imide elastomer which is constituted of (i) segments of polycapramide-imide with carboxylic groups having a number average molecular weight of 400 to 3000 formed from both caprolactam and an aromatic tricarboxylic acid capable of forming one imide ring or an aromatic tetracarboxylic acid capable of forming two imide rings and (ii) polyoxytetramethylene glycol segments having a number average molecular weight of 500 to 4000.

5. The polyacetal composition of claim 1, wherein the polyamide elastomer is a polycapramide-imide elastomer which is constituted of (i) segments of polycapramide-imide with carboxyl groups having a number average molecular weight of 400 to 3000 formed from both caprolactam and an aromatic tricarboxylic acid capable of forming one imide ring or an aromatic tetracarboxylic acid capable of forming two imide rings, and (ii) polyoxyethylene glycol segments or polyoxyethylene glycol-polyoxytetramethylene glycol mixed segments having a number average molecular weight of 500 to 4000.

6. The polyacetal composition as claimed in any one of claims 1 or 2 wherein the polyamide elastomer is produced by using trimellitic acid or pyromellitic acid as the trivalent or tetravalent aromatic polycarboxylic acid ingredient of said polycapramide-imide with carboxyl group.

7. A stretched and oriented polyacetal material which consists mainly of a polyacetal composition set forth in claim 1 and has a tensile modulus of at least 10 GPa, wherein said material has a draw ratio of 8 to 35 times.

8. A stretched and oriented polyacetal material which consists mainly of a polyacetal composition set forth in claim 4 and has a tensile modulus of at least 10 GPa, wherein said material has a draw ratio of 8 to 35 times.

9. A stretched and oriented polyacetal material which consists mainly of a polyacetal composition set forth in claim 5 and has a tensile modulus of at least 10 GPa, wherein said material has a draw ratio of 8 to 35 times.

10. A stretched and oriented polyacetal material which consists mainly of a polyacetal composition set forth in claim 2 and has a tensile modulus of at least 10 GPa, wherein said material has a draw ratio of 8 to 35 times.

11. A stretched and oriented polyacetal material as claimed in any one of claims 7, 9 or 10, which has a tensile modulus of 20 to 60 GPa.

12. A stretched and oriented polyacetal material as claimed in any one of claims 7, 9 or 10, which has a tensile modulus of 30 to 60 GPa.

13. The stretched and oriented polyacetal material of claim 11, which is used for the construction of ropes and cables.

14. The stretched and oriented polyacetal material of claim 12, which is used as a bead for tires.

15. The stretched and oriented polyacetal material of claim 12, which is used as a fibrous reinforcement for rubber composites.

16. The stretched and oriented polyacetal material of claim 12, which is used as a fibrous reinforcement for plastic composites.

17. A transparent polycapramide elastomer represented by the general formula wherein,
G denotes a residue remaining after removal of the hydroxy group from at least one glycol selected from polyoxyalkylene glycols and α,ω-dihydroxyhydrocarbon which have number average molecular weights of 500 to 4000, PA denotes a radical remaining after removal of the carboxy groups from a polycapramide-imide having carboxyl groups having a number average molecular weight of 400 to 3000 formed from both caprolactam and an aromatic tricarboxylic acid capable of forming one imide ring or an aromatic tetracarboxylic acid capable of forming two imide rings and said elastomer exhibiting a relative viscosity of at least 1.5 in m-cresol at 30° C. at a polymer concentration of 0.5 g/dl, the ratio by weight of the polycapramide-imide with carboxylic groups to the glycol being from 10/90 to 65/35, and the haze value of a 1-mm thick sheet of the elastomer being up to 75%.

* * * * *